3,290,412
**MOLDING COMPOUNDS PREPARED FROM MIX-
TURES OF POLYTETRAFLUOROETHYLENE
AND RESINOUS POLYCARBONATES**
Kenneth B. Goldblum, Pittsfield, Mass., assignor to General Electric Company, a corporation of New York
No Drawing. Filed Oct. 31, 1963, Ser. No. 320,542
6 Claims. (Cl. 260—873)

This invention relates to polytetrafluoroethylene resins and more particularly is concerned with moldable polytetrafluoroethylene resin mixtures.

High molecular weight polymers of tetrafluoroethylene are well known, commercially available materials having a variety of applications in the plastics industry. Such polymers or resins exhibit excellent frictional and non-adhesive properties, are highly inert to organic solvents, and possess a high thermal stability as well as a high dielectric strength accompanied by a low dielectric loss. However, a major problem encountered in the fabrication of parts from polytetrafluoroethylene has been its poor moldability. The closest analog to what might be termed "molding" of such resins has been accomplished by sintering them at high pressure near their transition temperature (327° C.). Accordingly, parts may not be fabricated of polytetrafluoroethylene with the use of conventional thermoplastic molding equipment.

An attempt to overcome the molding problem of polytetrafluoroethylene has been through copolymerization of the tetrafluoroethylene with other monomers. However, the improvement in moldability thus attained has always been at the expense of some of the desirable properties of the polytetrafluoroethylene. Consequently, a means for improving the moldability of polytetrafluoroethylene resins without appreciably affecting any of their desirable properties has heretofore not been available.

Unexpectedly, I have discovered that the moldability of polytetrafluoroethylene resins may be significantly improved by incorporating a polycarbonate resin into a polytetrafluoroethylene system. Briefly stated, I have found that when a polycarbonate resin is added to polytetrafluoroethylene resin in the form of fine particles having diameters ranging from about 20 microns to about 1000 microns, the resulting mixture may be molded with apparatus of the type conventionally employed in connection with the molding of thermoplastic resins to provide parts which possess, to a large extent, the desirable properties of parts prepared from unmodified polytetrafluoroethylene.

In accordance with my invention, it has been found that this highly desirable property of moldability may be imparted to polytetrafluoroethylene when the polycarbonate is added thereto in amounts ranging from about 10% to about 40% of the total weight of the polytetrafluoroethylene and the polycarbonate. Generally speaking, when amounts less than about 10% are used, the improvement in the moldability of the polytetrafluoroethylene is not readily detectable, and when the amount exceeds about 40%, the mixture begins to lose the beneficial properties of the polytetrafluoroethylene.

The addition of polycarbonate resin to polytetrafluoroethylene to provide the moldable resin mixtures of the invention may be accomplished in any manner so long as a thorough distribution of the polycarbonate in the polytetrafluoroethylene resin is obtained. For example, the mixing of materials may be accomplished by any of the methods normally employed for incorporation of plasticizers or fillers into thermoplastic polymers, such as, for example, with the aid of mixing rolls, doughmixers, Banbury mixers, extruders, and other mixing equipment. The resulting mixtures may be handled in any conventional manner employed for the fabrication or manipulation of thermoplastic resins. The materials may be formed or molded using compression, injection, calendering and extrusion techniques. It should be understood that the polytetrafluoroethylene mixtures prepared in accordance with the invention may also contain in addition to the polycarbonate, other additives as, for example, those used to prevent oxidation or lend color to the material. Such additives are well known in the art and may be incorporated without departing from the scope of the invention.

The fact that moldable resin mixtures may be obtained by adding a polycarbonate resin to a polytetrafluoroethylene system is totally unexpected and is not fully understood. For example, I have discovered that the particle size of the polytetrafluoroethylene is critical in this respect. Specifically, I have found that the polytetrafluoroethylene resin used to provide the compositions of this invention must be in the form of fine particles having diameters ranging from at least 20 microns to about 1000 microns. Polytetrafluoroethylene in the form of fine particles having diameters less than 20 microns has been found to be unsuitable in providing moldable mixtures when admixed with polycarbonate resin in accordance with the invention. For example, the admixture of polytetrafluoroethylene resin of the type described in U.S. Patent 3,005,795 (i.e., polytetrafluoroethylene in the form of particles having diameters ranging from about 100 A. up to about 2 microns) with a polycarbonate resin in the proportions herein specified does not result in the production of a moldable resin mixture.

I have also found that polycarbonate resins having a glass transition temperature of at least about 125° C. are unique among thermoplastics insofar as their ability to impart moldability to polytetrafluoroethylene resin is concerned. Specifically, thermoplastics such as, for example, polystyrene, cellulose acetate butyrate, polyacetals, or even polycarbonate resins having glass transition temperatures less than about 125° C., when admixed in the proportions specified, with polytetrafluoroethylene (having a particle size ranging from about 20 to about 1000 microns), result in mixtures which cannot be molded.

The aromatic carbonate polymers used to provide the moldable polytetrafluoroethylene mixtures of the present invention may be prepared by reacting a dihydric phenol with a carbonate precursor such as phosgene, a bishaloformate or a carbonate ester. Generally speaking, such carbonate polymers may be typified as possessing recurring structural units of the formula

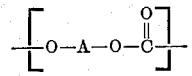

where A is a divalent aromatic radical of the dihydric phenol employed in the polymer producing reaction. Preferably, the carbonate polymers used to provide the resinous mixtures of the invention have an intrinsic viscosity (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, two hydroxyl radicals, each of which is attached directly to a carbon atom of an aromatic nucleus. Typical dihydric phenols are 2,2-bis(4-hydroxyphenyl) propane; hydroquinone; resorcinol; 2,2 bis-(4-hydroxyphenyl) pentane; 2,4' dihydroxydiphenyl methane; bis-(2-hydroxyphenyl) methane; bis-(4-hydroxyphenyl) methane; bis-(4-hydroxy-5-nitrophenyl) methane; 1,1 bis-(4-hydroxyphenyl) ethane; 3,3 bis-(4-hydroxyphenyl) pentane; 2,2' dihydroxydiphenyl; 2,6 dihydroxy naphthalene; bis-(4-hydroxyphenyl) sulfone; 2,4' dihydroxydiphenyl sulfone; bis-(4-hydroxyphenyl) diphenyl disulfone; 4,4' dihydroxydiphenyl ether; and 4,4' dihydroxy-2,5-diethoxydiphenyl ether. A variety of additional dihydric phenols which may be employed to provide such carbonate polymers are disclosed in U.S. Patent 2,999,835—Goldberg assigned to the assignee of the present invention. It is, of course, possible to employ two or more different dihydric phenols or a dihydric phenol in combination with a glycol, a hydroxy or acid terminated polyester, or a dibasic acid in the event a carbonate copolymer rather than a homopolymer is desired for use in the preparation of the moldable polytetrafluoroethylene mixtures of the invention. More specific directions for preparing polycarbonate resins as well as other starting materials and polymers prepared therefrom may be found in Canadian Patent 661,282 and in U.S. Patent 3,030,331, assigned to the assignee of this invention.

In order that those skilled in the art may better understand how the present invention may be practiced, the following examples are given by way of illustration and not by way of limitation. All parts and percentages are by weight unless otherwise noted.

*Example 1*

Sixty parts of Teflon 5 (a polytetrafluoroethylene powder produced and marketed by the duPont Company, having a particle size ranging from about 20 microns to about 1000 microns) were placed in a container and 40 parts of poly p,p'-(2,2-diphenylpropane) carbonate having an intrinsic viscosity of 0.54 (in dioxane at 30.3° C.) were added thereto. The mixture was then agitated to effect a thorough distribution of the polycarbonate in the polytetrafluoroethylene, and subsequently was extruded on a John-Royle extruder and the extrudate chopped to provide pellets. These pellets were then molded into 2½" x ½" x ⅛" impact bars on a 2½ ounce Van Dorn press. Cylinder temperatures of 580–600° F. and 1500–1600 p.s.i. oil pressures were used during the molding operation. The resulting bars were tested, and the test results compared with values obtained by testing bars from 100% polytetrafluoroethylene. The comparison of the data obtained is shown in Table I below:

TABLE I

| Composition | Izod Impact, ft. lbs./in. Notch | Heat Distortion Temperature, °C. | | Flexural Properties, p.s.i. | | Coefficient of Sliding Friction |
|---|---|---|---|---|---|---|
| | | 264 p.s.i. | 66 p.s.i. | Modulus | Yield | |
| 100% Teflon (Control) | 3.0 | 121 | 121 | 51,500 | 1,890 | 0.05 |
| 60% Teflon, 40% polycarbonate | 3.2 | 136 | 147 | 285,500 | 8,570 | 0.16 |

*Example 2*

Example 1 was repeated except that 80 parts of polytetrafluoroethylene and 20 parts of polycarbonate resin were employed to provide the resin mixtures which were subsequently treated and molded into impact bars as in that example. The results of the tests conducted on these bars are shown in Table II below:

TABLE II

| Composition | Izod Impact, ft. lbs./in. Notch | Heat Distortion Temperature, °C. | | Flexural Properties, p.s.i. | | Coefficient of Sliding Friction |
|---|---|---|---|---|---|---|
| | | 264 p.s.i. | 66 p.s.i. | Modulus | Yield | |
| 80% Teflon, 20% polycarbonate | 2.2 | 130 | 144 | 186,000 | 5,910 | 0.13 |

*Example 3*

Example 1 was repeated except that a mixture of 90% Teflon 5 and 10% polycarbonate was employed. The resulting impact bars were tested and exhibited properties substantially identical to those reported in Table II.

*Example 4*

Eighty parts by weight of polytetrafluoroethylene in the form of fine particles (fibers having lengths of from about 20 microns to about 500 microns) were admixed with 20 parts by weight of a copolycarbonate prepared by phosgenating a mixture of 97 parts by weight of 2,2 bis-(4-hydroxyphenyl) propane and 3 parts by weight of 2,2 bis-(4-hydroxy-3,5-dibromophenyl) propane. The mixture was treated as in Example 1 and test bars were prepared therefrom as in that example. The resulting bars exhibited properties substantially identical to the test bars prepared in Example 2.

*Example 5*

By the method of Example 1, a mixture of 80 parts of Teflon 5 and 20 parts of poly p,p'-(2,2-diphenyl propane) carbonate was extruded and the extrudate chopped into fine pellets. These pellets were dried overnight at 125° C. in an air circulating oven and subsequently were introduced into a John-Royle 1⅛" Spirod extruder. A copper wire 53 mils in diameter was threaded through the extruder die and was coated with the polytetrafluoroethylene-polycarbonate mixture.

*Example 6*

This example serves to illustrate that polycarbonate resins are unique with respect to imparting moldability to polytetrafluoroethylene resin. By the method of Example 1, the following resin mixtures were prepared:

80% Teflon 5–20% polystyrene
80% Teflon 5–20% cellulose acetobutyrate
80% Teflon 5–20% Delrin (a polyacetal resin produced and marketed by the duPont Company)

None of the above mixtures was capable of being molded into 2½" x ½" x ⅛" impact bars in the 2½ ounce Van Dorn press, even though maximum press pressures were employed during the molding operation. The products obtained were in the shape of partially filled shot from one-quarter to three-quarters of the length of the bar.

By virtue of the present invention, there is provided a new class of polytetrafluoroethylene resin mixtures which may be molded or shaped into a variety of useful parts by apparatus of the type conventionally used in connection with molding thermoplastic resins, as injection molding apparatus, for example. Such resinous mixtures may be employed in preparing gaskets, tubing or pipes, as well as other materials which will exhibit to a large extent the properties of parts prepared by sintering polytetrafluoroethylene powder. Because of their good heat resistance and electrical properties, the moldable polytetrafluoroethylene mixtures of the invention may be used as coatings for rods and wire and as slot insulation for dynamoelectric machines. In addition, the moldable resin mixtures of the invention may be used to provide molded parts whose successful operation depends on a low coefficient of friction as, for example, wheels, gears and bearings. The compositions of the invention may also be admixed with other resinous materials, fillers, plasticizing agents, dyes, pigments, etc. commonly used with thermoplastic molding compositions.

What I claim as new and desire to secure by Letters Patent of the United States is:

1. A moldable resin mixture consisting essentially of (1) a polytetrafluoroethylene resin in the form of particles having diameters ranging from about 20 microns to about 1000 microns and (2) a polycarbonate resin having a glass transition temperature of at least about 125° C. in an amount ranging from about 10% to about 40% of the total weight of the polytetrafluoroethylene and the polycarbonate.

2. A moldable resin mixture consisting essentially of (1) a polytetrafluoroethylene resin in the form of particles having diameters ranging from about 20 microns to about 1000 microns and (2) a polycarbonate of 2,2 bis-(4-hydroxyphenyl) propane having a glass transition temperature of at least about 125° C. in an amount ranging from about 10% to about 40% of the total weight of the polytetrafluoroethylene and the polycarbonate.

3. A moldable resin mixture consisting essentially of (1) a polytetrafluoroethylene resin in the form of particles having diameters ranging from about 20 microns to about 1000 microns and (2) a polycarbonate resin having a glass transition temperature of at least about 125° C. in an amount equal to about 20% of the total weight of the polytetrafluoroethylene and the polycarbonate.

4. A process for imparting moldability to a polytetrafluoroethylene resin in the form of particles having diameters ranging from about 20 microns to about 1000 microns which comprises mixing said resin with a polycarbonate resin having a glass transition temperature of greater than about 125° C. to provide a moldable resin mixture in which the polycarbonate is present in an amount ranging from about 10% to about 40% of the total weight of the polytetrafluoroethylene and the polycarbonate.

5. The process of claim 4 in which the polycarbonate is poly p,p'-(diphenylpropane) carbonate.

6. An injection molded part as prepared by injection molding the resin mixture of claim 1.

No references cited.

MURRAY TILLMAN, *Primary Examiner.*

J. T. GOOLKASIAN, *Assistant Examiner.*